(12) United States Patent
Johnson

(10) Patent No.: US 11,519,427 B2
(45) Date of Patent: Dec. 6, 2022

(54) BRUSHLESS MOTOR WITH SUPPORT STRUTS

(71) Applicant: Dyson Technology Limited, Wiltshire (GB)

(72) Inventor: Mark Andrew Johnson, Bath (GB)

(73) Assignee: Dyson Technology Limited, Malmesbury (GB)

( * ) Notice: Subject to any disclaimer, the term of this patent is extended or adjusted under 35 U.S.C. 154(b) by 40 days.

(21) Appl. No.: 16/011,954

(22) Filed: Jun. 19, 2018

(65) Prior Publication Data
US 2018/0363679 A1    Dec. 20, 2018

(30) Foreign Application Priority Data
Jun. 20, 2017 (GB) ..................................... 1709833

(51) Int. Cl.
| | | |
|---|---|---|
| *F04D 29/66* | (2006.01) | |
| *H02K 9/06* | (2006.01) | |
| *H02K 7/16* | (2006.01) | |
| *H02K 5/20* | (2006.01) | |
| *H02K 1/14* | (2006.01) | |

(52) U.S. Cl.
CPC ......... *F04D 29/667* (2013.01); *F04D 29/666* (2013.01); *H02K 5/207* (2021.01); *H02K 7/16* (2013.01); *F05D 2240/20* (2013.01); *F05D 2260/96* (2013.01); *H02K 1/141* (2013.01); *H02K 9/06* (2013.01)

(58) Field of Classification Search
CPC ...... F04D 29/677; F04D 29/666; F04D 29/64; F05D 2240/20; F05D 2260/96; H02K 5/20; H02K 5/15; H02K 7/16; H02K 1/141; H02K 9/06; H02K 9/02

USPC ............................................ 310/62, 63, 60 A
See application file for complete search history.

(56) References Cited

U.S. PATENT DOCUMENTS

| | | |
|---|---|---|
| 4,883,982 A | 11/1989 | Forbes et al. |
| 5,081,384 A | 1/1992 | Rausch |
| (Continued) | | |

FOREIGN PATENT DOCUMENTS

| | | |
|---|---|---|
| CN | 1465868 A | 1/2004 |
| CN | 201328048 | 10/2009 |
| (Continued) | | |

OTHER PUBLICATIONS

Search Report dated Dec. 8, 2017, directed to GB Application No. 1709833.6; 2 pages.

(Continued)

*Primary Examiner* — Michael Andrews
(74) *Attorney, Agent, or Firm* — Faegre Drinker Biddle & Reath LLP

(57) ABSTRACT

A brushless motor comprising a rotor assembly comprising a shaft, an impeller, a bearing assembly and a rotor core; a stator assembly; a frame comprising an outer portion and a support portion radially inward of the outer portion, the support portion supporting at least one of the rotor assembly and the stator assembly; and at least one strut extending between the outer portion and the support portion, wherein the strut and the stator assembly are aligned such that at least part of the strut and at least part of the stator assembly are disposed along a line substantially parallel to a rotation axis of the rotor assembly.

18 Claims, 5 Drawing Sheets

(56) References Cited

U.S. PATENT DOCUMENTS

| | | | |
|---|---|---|---|
| 6,147,415 | A | 11/2000 | Fukada |
| 8,475,111 | B2 | 7/2013 | Stagg et al. |
| 8,593,022 | B2 | 11/2013 | Lau et al. |
| 2007/0230839 | A1 | 10/2007 | Childe et al. |
| 2008/0315729 | A1* | 12/2008 | Noda .................. H02K 9/06 310/60 R |
| 2010/0225184 | A1 | 9/2010 | Yuan |
| 2011/0037330 | A1 | 2/2011 | Dutau |
| 2012/0001505 | A1 | 1/2012 | Henke |
| 2013/0249330 | A1* | 9/2013 | King .................. H02K 21/14 310/43 |
| 2014/0132110 | A1 | 5/2014 | Burton et al. |
| 2014/0158131 | A1 | 6/2014 | Kenyon et al. |
| 2014/0328674 | A1 | 11/2014 | Jacob et al. |
| 2015/0298537 | A1 | 10/2015 | Duhamel et al. |
| 2015/0351599 | A1* | 12/2015 | Park .................. F04D 29/541 310/68 B |
| 2016/0204676 | A1* | 7/2016 | Ziegler .............. F24H 3/0405 310/59 |
| 2017/0170693 | A1* | 6/2017 | Dymond ............ H02K 37/16 |
| 2017/0170697 | A1* | 6/2017 | Locke ................ H02K 1/143 |
| 2017/0170709 | A1* | 6/2017 | Barnes .............. H02K 9/06 |
| 2017/0231451 | A1* | 8/2017 | Oshikiri ............ H02K 1/185 15/347 |

FOREIGN PATENT DOCUMENTS

| | | |
|---|---|---|
| CN | 101990732 A | 3/2011 |
| CN | 201781343 U | 3/2011 |
| CN | 203734386 | 7/2014 |
| CN | 105048715 | 11/2015 |
| CN | 206237216 | 6/2017 |
| CN | 208623520 U | 3/2019 |
| DE | 10 2011 122 534 | 6/2013 |
| DE | 102012101757 | 9/2013 |
| EP | 1 063 755 A1 | 12/2000 |
| EP | 1493900 A2 | 1/2005 |
| EP | 2006976 | 12/2008 |
| EP | 2 091 135 | 8/2009 |
| GB | 857471 | 12/1960 |
| GB | 2046849 A | 11/1980 |
| GB | 2545269 | 6/2017 |
| JP | 54-105903 | 7/1979 |
| JP | 7-15910 | 1/1995 |
| JP | H7-298545 A | 11/1995 |
| JP | 2003-201986 | 7/2003 |
| JP | 2007-506053 | 3/2007 |
| JP | 3951466 B2 | 8/2007 |
| JP | 2014-220998 | 11/2014 |
| KR | 10-1127379 | 3/2012 |
| RU | 2 068 610 | 10/1996 |
| WO | 98/54463 | 12/1998 |
| WO | 2009/087274 A3 | 3/2010 |

OTHER PUBLICATIONS

Notification of Reason for Rejection dated Jun. 3, 2019, directed to JP Application No. 2018-116760; 5 pages.

International Search Report and Written Opinion dated Jun. 14, 2018, directed to International Application No. PCT/GB2018/ 051130; 13 pages.

The First Office Action dated Nov. 22, 2019, directed to CN Application No. 2018105755472; 14 pages.

Office Action dated Dec. 7, 2020, directed to EP Application No. 18722178.3; 7 pages.

The Third Office Action dated Dec. 24, 2020, directed to CN Application No. 2018105755472; 12 pages.

Office Action received for Korean Patent Application No. 10-2020-7000341, dated Jun. 8, 2021, 9 pages (5 pages of English Translation and 4 pages of Original Document).

* cited by examiner

BRUSHLESS MOTOR WITH SUPPORT STRUTS

REFERENCE TO RELATED APPLICATIONS

This application claims the priority of United Kingdom Application No. 1709833.6, filed Jun. 20, 2017, the entire contents of which are incorporated herein by reference.

FIELD OF THE INVENTION

Embodiments of the present invention relate to brushless motors.

BACKGROUND OF THE INVENTION

There is a general desire to improve electric motors in a number of ways. In particular, improvements may be desired in terms of size, weight, manufacturing cost, efficiency, reliability and noise.

SUMMARY OF THE INVENTION

According to a first aspect, there is provided a brushless motor comprising a rotor assembly comprising a shaft, an impeller, a bearing assembly and a rotor core; a stator assembly; a frame comprising an outer portion and a support portion radially inward of the outer portion, the support portion supporting at least one of the rotor assembly and the stator assembly; and at least one strut extending between the outer portion and the support portion, wherein the strut and the stator assembly are aligned such that at least part of the strut and at least part of the stator assembly are disposed along a line substantially parallel to a rotation axis of the rotor assembly.

The brushless motor can therefore be improved by aligning the stator assembly and strut such that the strut is located at least partially within the slipstream of the stator assembly, or vice versa, when air flow is moving through the motor in use. As such, the air flow does not need to change direction a significant amount, or indeed at all, in order to flow around one of the strut and stator because the air flow is already flowing around the other of the strut and stator. This may contribute to a reduction in turbulence and noise within the motor.

In a preferred embodiment, air flows over the stator assembly and then the strut towards the impeller, though in other embodiments the air may flow over the strut first and/or the air flow direction may be reversed.

In some embodiments, the strut is tapered in a direction away from the stator assembly. Thus the strut is aerodynamically shaped and thus contributes further to a reduction in turbulence and noise within the motor.

In some embodiments, the circumferential width of the strut is less than the circumferential width of the stator assembly. This contributes to the aerodynamic profile of the strut by ensuring that air flow does not need to change direction significantly to flow past the strut after it has flowed over the stator assembly.

The motor may comprise a plurality of stator assemblies and a plurality of struts, each strut extending between the outer portion and the support portion and being aligned with a respective stator assembly such that at least part of the strut and at least part of the respective stator assembly are disposed along a line substantially parallel to a rotation axis of the rotor assembly. Therefore, in a motor with multiple stator assemblies, multiple struts may be used to interconnect different parts of the frame, thus increasing strength and stability. Each of the struts is located relative to a respective stator assembly to contribute to a reduction in turbulence and noise within the motor.

In some embodiments, the outer portion of the frame includes an impeller shroud covering the impeller. Therefore, for example, having the shroud integrated with the frame in this manner may simplify construction of the motor.

The outer portion of the frame may include a guide portion for guiding an airflow towards the impeller, for example to enhance performance of the motor.

BRIEF DESCRIPTION OF THE DRAWINGS

Embodiments of the invention will now be described by way of example only with reference to the accompanying drawings, in which.

DETAILED DESCRIPTION OF THE INVENTION

Figure 1:
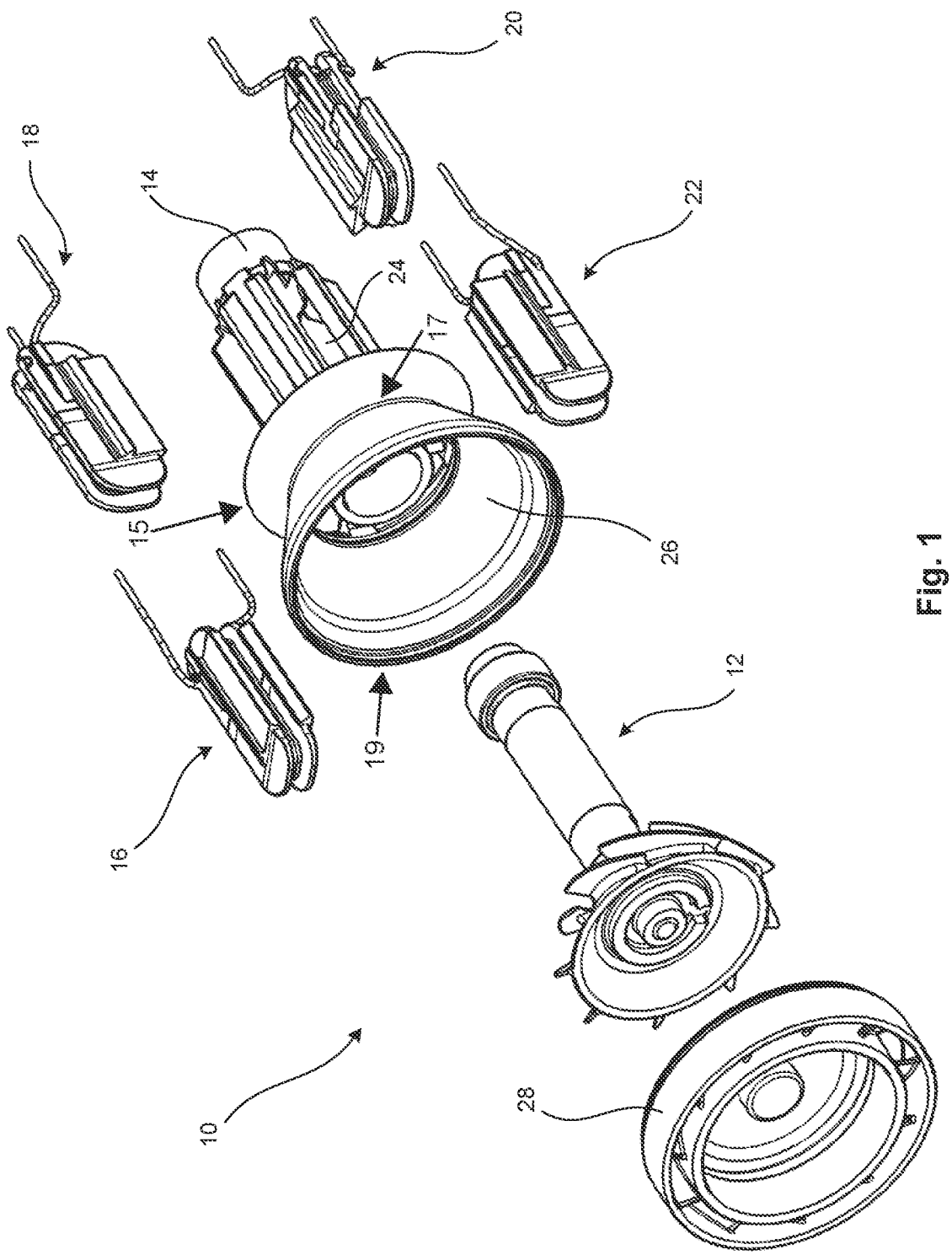
FIG. 1 shows an exploded perspective view of a motor according to embodiments of the invention.
Figure 4:
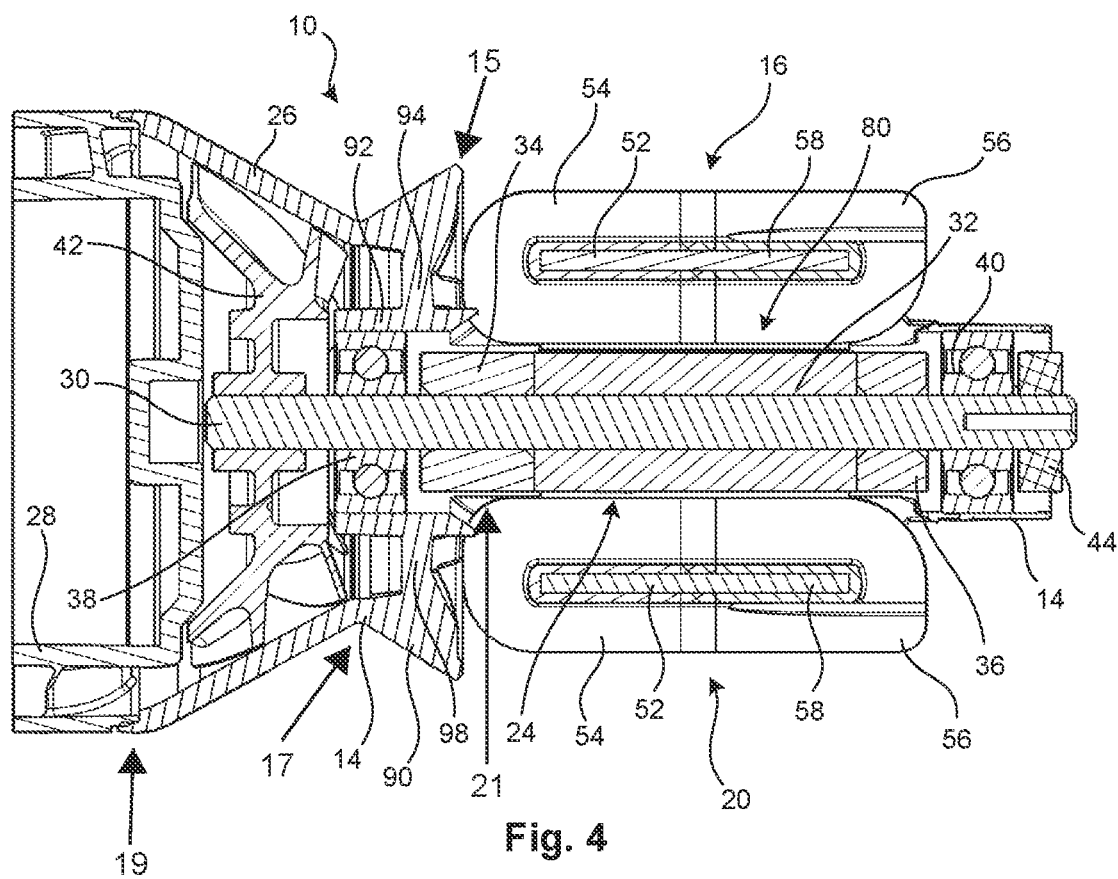
FIG. 4 shows a cross-section of a motor according to embodiments of the invention.

FIG. 1 shows an exploded perspective view of a motor 10 according to an embodiment of the invention. Certain components, such as control electronics and an external housing, are not shown for clarity. The motor 10 includes a rotor assembly 12, a frame 14 and four stator assemblies 16, 18, 20 and 22. When the motor 10 is assembled, the rotor assembly 12 is located within and mounted to the frame 14, and the stator assemblies are located in respective slots in the frame 14. For example, the stator assembly 20 is located within slot 24 in the frame. The frame 14 may be a one-piece construction, for example moulded as a single object, and includes an impeller shroud 26 that covers the impeller as shown in FIG. 4. As illustrated, frame 14 includes a first ultimate end 15, a second ultimate end 19, and a waist 17 positioned between the first ultimate end 15 and the second ultimate end 19. The motor 10 also includes a diffuser 28.

Figure 2:
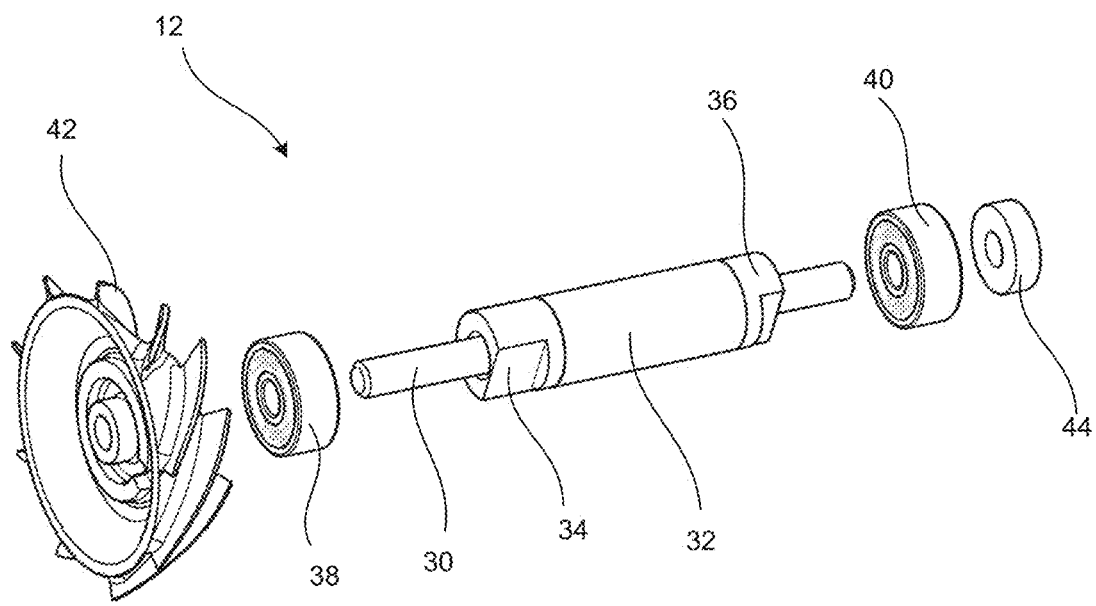
FIG. 2 shows an exploded perspective view of a rotor assembly.

FIG. 2 shows an exploded perspective view of the rotor assembly 12. The rotor assembly 12 comprises a shaft 30 on which is mounted a rotor core permanent magnet 32, a first balancing ring 34 and a second balancing ring 36. When the rotor assembly 12 is assembled, a pair of bearings 38, 40 are mounted on the shaft 30 on either side of the core 32 and balancing rings 34, 36. An impeller is 42 is mounted at one end of the shaft 30, and a sensor magnet 44 is mounted at the other end.

Figure 3:
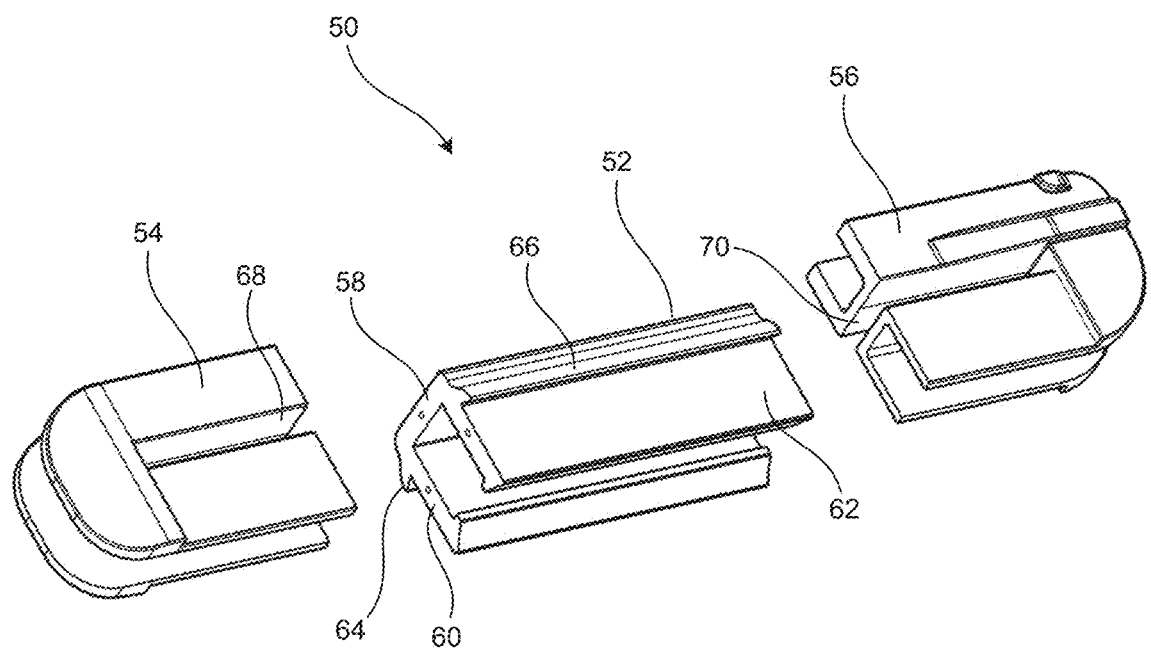
FIG. 3 shows an exploded perspective view of a stator according to embodiments of the invention.

FIG. 3 shows an exploded perspective view of a stator assembly 50. The stator assembly 50 may be any one of the stator assemblies 16, 18, 20, 22 shown in FIG. 1. The stator assembly 50 comprises a C-shaped stator core 52, a first C-shaped bobbin portion 54 and a second C-shaped bobbin portion 56.

The stator core 52 comprises a back 58, a first arm 60 and a second arm 62. Each of the arms 60, 62 includes a respective protrusion 64, 66 on the outer surface of the stator core 52. The protrusions 64, 66 extend along the axial length of the stator.

Figure 5:
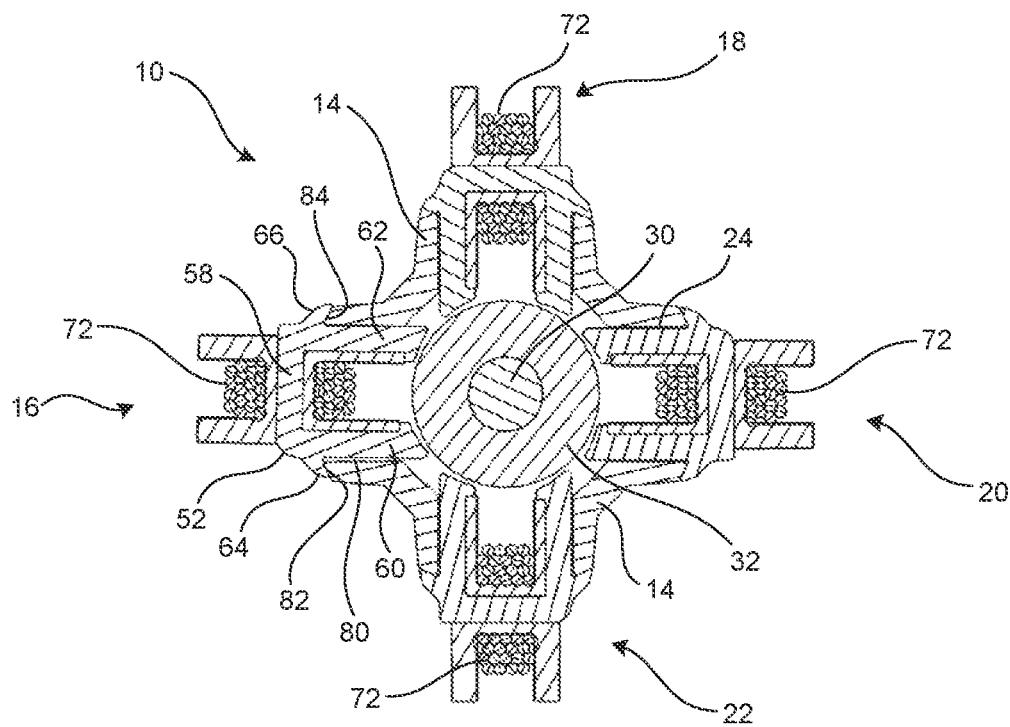
FIG. 5 shows a cross-section of a motor according to embodiments of the invention.

The first bobbin portion 54 includes arms that define a first slot 68. Similarly, the second bobbin portion 56 includes arms that define a second slot 70. The bobbin portions 54, 56 slide onto the stator core 52 such that, when assembled, the slots 68, 70 accommodate the back 58 of the stator core 52 as shown in FIGS. 1, 4 and 5. The bobbin portions 54, 56 have a generally H-shaped cross-section such that a stator winding (not shown) may be wound around the bobbin portions in the assembled stator assembly, and hence around the back 58 of the stator core 52.

FIG. 4 shows a cross-section of the assembled motor 10 through a plane that includes the axis of rotation of the rotor assembly 12. It can be seen that the bearings 38, 40 of the rotor assembly 12 are mounted directly to and within the frame 14. The stator assemblies 16, 20 are also shown inserted into their respective slots in the frame 14. Frame 14 includes an ultimate end 21 of the support portion, such that the ultimate end 15 of the outer portion is behind ultimate end 21 in the direction of airflow (see FIG. 8, arrows 110). It can be seen that on each stator assembly, the bobbin portions 54, 56 enclose the back 58 of the stator core 52.

FIG. 5 shows a cross-section of the assembled motor 10 through a plane that is perpendicular to the axis of rotation of the rotor assembly 12. The stator assemblies 16, 18, 20, 22 are shown including their respective windings 72. The stator assemblies 16, 18, 20, 22 are shown inserted into their respective slots in the frame 14. For example, stator assembly 16 is inserted into slot 80, whereas stator assembly 20 is shown inserted into slot 24.

The stator assemblies are inserted into their slots until the projections 64, 66 on the arms 60, 62 of the stator core 52 contact respective surfaces of the frame 14. For example, the projections 64, 66 of the stator core 52 of stator assembly 16 contact end surfaces 82, 84 respectively of the slot 80 in the frame 14. As a result, during assembly of the motor 10, each stator assembly may be inserted into its respective slot and slid in a radial direction towards the rotor assembly until the projections contact an appropriate part of the frame 14, such as the edges of the slot. For example, the stator 16 is shown in its fully inserted position, such that the projections 64, 66 contact the edges 82, 84 of the slot 80. The other stator portions 18, 20 and 22 may be inserted into their respective slots in a similar manner.

At this point, further insertion of the stator assembly into the slot is inhibited, and hence further radial movement of the stator assembly into the slot towards the rotor assembly 12 is inhibited. When the stator assemblies 16, 18, 20, 22 have been inserted fully into their respective slots, the stator assemblies may be fixed in position. For example, an adhesive may be applied to the region where the projections 64 and/or 66 contact the frame 14 to prevent further movement of the stator assemblies relative to the frame 14.

Therefore, in the assembled motor 10, the radial position of the stator cores 52 is set based on contact between the stator assemblies and the frame 14. In addition, the radial position of the rotor assembly 12 is set based on contact between the rotor assembly 12 and the frame 14. As a result, the clearance between the pole tips of the stator cores 52 and the rotor core 32 of the rotor assembly 12 is tightly controlled as it depends on tolerances of few components. The clearance can therefore be made smaller without the risk of the stator core pole tips contacting the rotor core 32.

Figure 6:
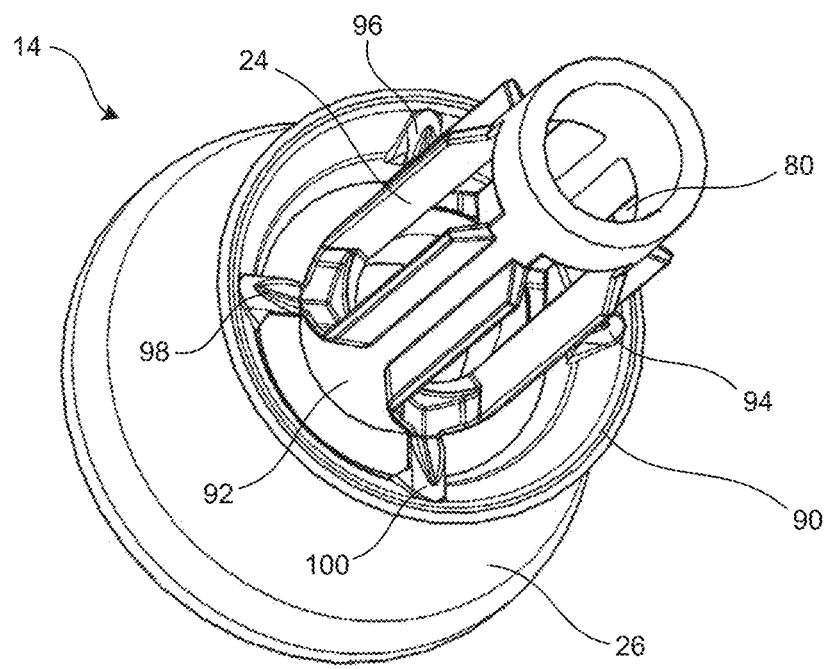
FIG. 6 shows a perspective view of a motor frame according to embodiments of the invention.
Figure 7:
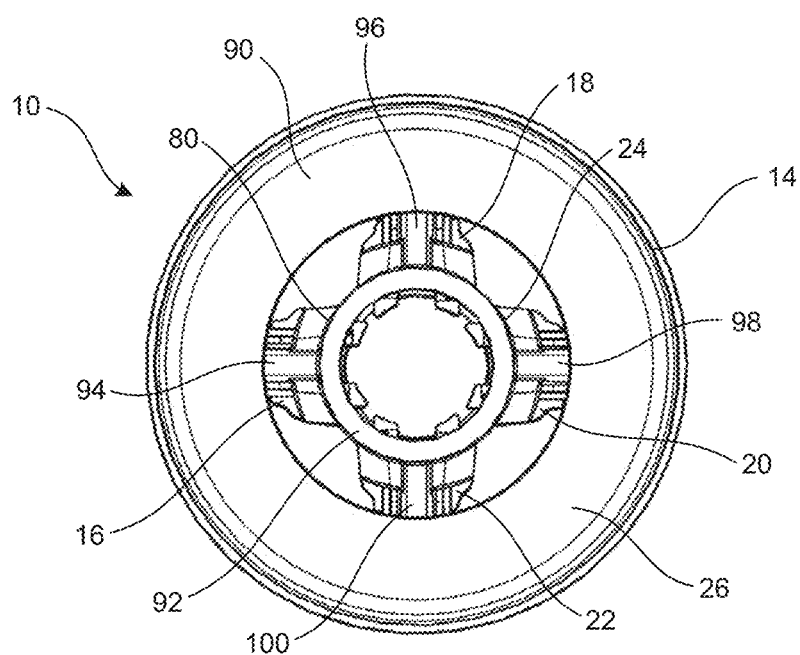
FIG. 7 shows an end view of a motor frame and stator assemblies according to embodiments of the invention.

FIG. 6 shows a perspective view of the frame 14, and FIG. 7 shows a view of the frame 14 and stator assemblies 16, 18, 20, 22 along the axial direction from the end of the frame 14 that comprises the shroud 26. The stator assemblies are shown in FIGS. 5 and 7 without the windings for clarity. It is shown that the frame 14 comprises an outer portion 90 and an inner portion 92 radially inward of and substantially concentric with the outer portion 90. The inner portion 92 may support the bearings 38, 40 as shown in FIG. 4. The outer portion 90 may include the shroud 26 and may directly or indirectly support other components, such as for example a motor housing or outer casing (not shown).

A plurality of struts 94, 96, 98, 100 extend in a radial direction between the outer portion 90 and the inner portion 92, to support the inner portion 92. In the example shown, there are four struts equally spaced around the circumference of the frame 14, though in other embodiments there may be one or more struts, and/or the struts may not be equally spaced or sized.

As shown in FIGS. 4, 6 and 7, the struts are located axially adjacent to the slots in the frame 14 for the stator assemblies (such as slots 24 and 80) so that when the stator assemblies are inserted into their respective slots, the stator assemblies are axially adjacent to the struts. That is, each strut is aligned with a respective stator assembly in an axial direction, such that the strut and the stator assembly are arranged along a line substantially parallel to the rotation axis of the rotor assembly 12.

In use, when the rotor assembly 12 of the motor 10 is rotating, in the embodiment shown, air flows in an axial direction over the stator assemblies 16, 18, 20, 22 and struts 94, 96, 98, 100, between the outer portion 90 and the inner portion 92 and towards the impeller 42. The air is required to flow around any obstacles such as the stator assemblies or struts, which may cause turbulence and noise within the motor. By aligning a strut and a stator assembly along an axial line, the air flow need not change direction to flow over one of these as it is already flowing over the other. In effect, one of these is located within the slipstream of the other. For example, in the motor 10 shown in the Figures, the struts 94, 96, 98, 100 are located within the slipstreams of stator assemblies 16, 18, 20 and 22 respectively. This can reduce turbulence and noise compared to a motor where the struts and stator assemblies are not aligned along axial directions.

Figure 8:
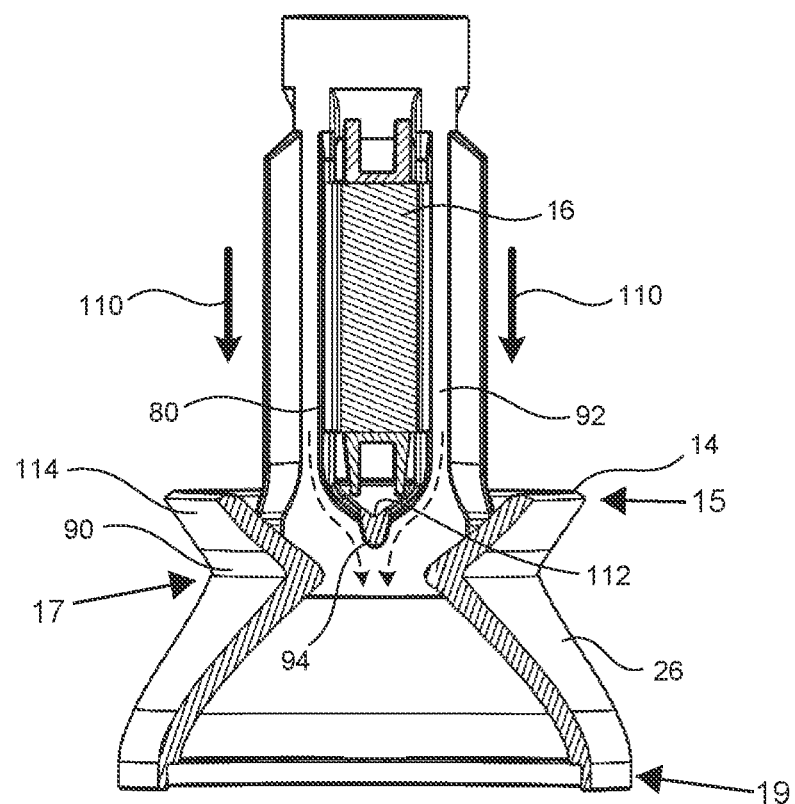
FIG. 8 shows a cross section through a frame and stator assembly according to embodiments of the invention.

FIG. 8 shows a cross section of the frame 14 and one of the stator assemblies 16 (which is shown without a winding for clarity). This cross section also shows a cross section through the strut 94. It is shown that the circumferential extent, or width in a circumferential direction, of the strut 94 is less than that of the stator assembly 16, such that the strut 94 is entirely "behind" the stator assembly 16 in the air flow direction. The air flow direction is shown generally by arrows 110 in FIG. 8. As such, the air flow through the motor 10 and between the inner portion 92 and outer portion 90 of the frame 14 does not need to encounter and flow around a side 112 of the strut facing the air flow, or does not need to encounter and flow around the side to such an extent, because the air flow is already flowing around the stator assembly 16. The air flow around the end of the stator assembly 16 and over the strut 94 is shown by the dashed arrows in FIG. 8. In some embodiments, the strut is close to the stator assembly 16 to ensure that this effect is achieved. The outer portion 90 of the frame 14 includes a guide portion 114 that guides the air flow 110 towards one end of the impeller 42 (shown in FIGS. 1, 2 and 4).

The cross section of the strut 94 shown in FIG. 8 also shows that the strut is tapered in a direction away from the stator assembly 16, and in a direction of air flow. This is to provide the strut 94 with an aerodynamic profile and reduce the occurrence of turbulence and noise once the air has flowed past the strut 94.

What is claimed is:

1. A brushless motor comprising:
    a rotor assembly comprising a shaft, an impeller, a bearing assembly and a rotor core;
    a stator assembly;
    a frame comprising an outer portion and a support portion radially inward of the outer portion, the support portion supporting both the rotor assembly and the stator assembly, wherein the outer portion of the frame comprises:
        a first ultimate end that is entirely behind a first ultimate end of the support portion, a second ultimate end that is spaced apart from the first ultimate end of the outer portion, and a waist positioned between the first ultimate end of the outer portion and the second ultimate end of the outer portion; and
        a guide portion that tapers from the first ultimate end of the outer portion in the direction of airflow to the waist for guiding an airflow towards the impeller; and
    at least one strut extending between the outer portion and the support portion, wherein the strut and a stator core of the stator assembly are aligned such that at least part of the strut and at least part of the stator core are disposed along a line substantially parallel to a rotation axis of the rotor assembly such that the strut is entirely behind the stator assembly in the direction of airflow such that the strut is located entirely within a slipstream of the stator core.

2. The brushless motor of claim 1, wherein the strut is tapered in a direction away from the stator assembly.

3. The brushless motor of claim 1, wherein a circumferential width of the strut is less than a circumferential width of the stator core.

4. The brushless motor of claim 1, comprising a plurality of stator assemblies and a plurality of struts, each strut extending between the outer portion and the support portion and being aligned with a respective stator assembly such that at least part of the strut and at least part of the respective stator assembly are disposed along a line substantially parallel to a rotation axis of the rotor assembly.

5. The brushless motor of claim 1, wherein the outer portion of the frame includes an impeller shroud covering the impeller.

6. The brushless motor of claim 1, wherein the outer portion of the frame includes an impeller shroud covering the impeller and extending from the waist of the outer portion in the direction of airflow.

7. A brushless motor comprising:
    a rotor assembly comprising a shaft, an impeller, a bearing assembly and a rotor core;
    a stator assembly;
    a frame comprising an outer portion and a support portion radially inward of the outer portion, the support portion supporting at least one of the rotor assembly and the stator assembly wherein the outer portion of the frame includes:
        a waist positioned between a first ultimate end of the outer portion and a second ultimate end of the outer portion; and
        a guide portion that tapers from the first ultimate end in the direction of airflow to the waist for guiding an airflow towards the impeller; and
    at least one strut extending between the outer portion and the support portion, wherein the strut and a stator core of the stator assembly are aligned such that at least part of the strut and at least part of the stator core are disposed along a line substantially parallel to a rotation axis of the rotor assembly such that the strut is entirely behind the stator assembly in the direction of airflow, wherein the outer portion includes the first ultimate end and the second ultimate end spaced apart from the first ultimate end of the outer portion, the second ultimate end of the outer portion being entirely behind the first ultimate end of the outer portion in the direction of airflow along the rotation axis of the rotor assembly and the first ultimate end of the outer portion is entirely behind a first ultimate end of the support portion in the direction of airflow along the rotation axis of the rotor assembly.

8. The brushless motor of claim 7, wherein at least one strut is tapered in a direction away from the stator assembly.

9. The brushless motor of claim 7, wherein a circumferential width of at least one strut is less than a circumferential width of the stator core.

10. The brushless motor of claim 7, further comprising a plurality of stator assemblies and a plurality of struts, wherein each strut extends between the outer portion and the support portion and is aligned with a respective stator assembly of the plurality of stator assemblies, such that at least part of the strut and at least part of the respective stator assembly are disposed along a line substantially parallel to a rotation axis of the rotor assembly.

11. The brushless motor of claim 7, wherein the outer portion of the frame includes an impeller shroud covering the impeller.

12. The brushless motor of claim 7, wherein the outer portion of the frame includes an impeller shroud covering the impeller and extending from the waist of the outer portion in the direction of airflow.

13. A brushless motor comprising:
    a rotor assembly comprising a shaft, an impeller, a bearing assembly and a rotor core;
    a stator assembly;
    a frame comprising an outer portion and a support portion radially inward of the outer portion, the support portion supporting at least one of the rotor assembly and the stator assembly, wherein the outer portion of the frame includes a guide portion that tapers from a first ultimate end of the outer portion in the direction of airflow to a waist for guiding an airflow towards the impeller; and
    at least one strut extending between the outer portion and the support portion, wherein the strut and a stator core of the stator assembly are aligned such that at least part of the strut and at least part of the stator core are disposed along a line substantially parallel to a rotation axis of the rotor assembly such that the strut is entirely behind the stator assembly in the direction of airflow, wherein the outer portion includes the first ultimate end, a second ultimate end spaced apart from the first ultimate end of the outer portion, and the waist positioned between the first ultimate end of the outer portion and the second ultimate end of the outer portion, the second ultimate end being entirely behind the first ultimate end of the outer portion in the direction of airflow along the rotation axis of the rotor assembly.

14. The brushless motor of claim 13, wherein at least one strut is tapered in a direction away from the stator assembly.

15. The brushless motor of claim 13, wherein a circumferential width of at least one strut is less than a circumferential width of the stator core.

16. The brushless motor of claim 13, further comprising a plurality of stator assemblies and a plurality of struts, wherein each strut extends between the outer portion and the support portion and is aligned with a respective stator assembly of the plurality of stator assemblies, such that at least part of the strut and at least part of the respective stator assembly are disposed along a line substantially parallel to a rotation axis of the rotor assembly.

17. The brushless motor of claim 13, wherein the outer portion of the frame includes an impeller shroud covering the impeller.

18. The brushless motor of claim 13, wherein the outer portion of the frame includes an impeller shroud covering the impeller and extending from the waist of the outer portion in the direction of airflow.

\* \* \* \* \*